(12) United States Patent
Anand et al.

(10) Patent No.: US 8,291,430 B2
(45) Date of Patent: Oct. 16, 2012

(54) OPTIMIZING SYSTEM PERFORMANCE USING SPARE CORES IN A VIRTUALIZED ENVIRONMENT

(75) Inventors: Vaijayanthimala K. Anand, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 12/500,628

(22) Filed: Jul. 10, 2009

(65) Prior Publication Data

US 2011/0010709 A1 Jan. 13, 2011

(51) Int. Cl.
*G06F 9/46* (2006.01)

(52) U.S. Cl. ........................................................ 718/104

(58) Field of Classification Search .................. None
See application file for complete search history.

(56) References Cited

U.S. PATENT DOCUMENTS

| | | | |
|---|---|---|---|
| 7,117,499 B2 | 10/2006 | Kawamoto et al. | |
| 7,257,734 B2 | 8/2007 | Vaidyanathan | |
| 7,366,948 B2 | 4/2008 | Michaelis et al. | |
| 8,046,767 B2 * | 10/2011 | Rolia et al. | 718/104 |
| 2008/0235454 A1 * | 9/2008 | Duron et al. | 711/128 |
| 2011/0004500 A1 * | 1/2011 | Nathuji | 705/7 |

* cited by examiner

*Primary Examiner* — Meng-Ai An
*Assistant Examiner* — Eric C Wai
(74) *Attorney, Agent, or Firm* — Yee & Associates, P.C.; David A. Mims, Jr.

(57) ABSTRACT

A mechanism for optimizing system performance using spare processing cores in a virtualized environment. When detecting a workload partition needs to run on a virtual processor in the virtualized system, a state of the virtual processor is changed to a wait state. A first node comprising memory that is local to the workload partition is determined. A determination is also made as to whether a non-spare processor core in the first node is available to run the workload partition. If no non-spare processor core is available, a free non-spare processor core in a second node is located, and the state of the free non-spare processor core in the second node is changed to an inactive state. The state of a spare processor core in the first node is changed to an active state, and the workload partition is dispatched to the spare processor core in the first node for execution.

19 Claims, 6 Drawing Sheets

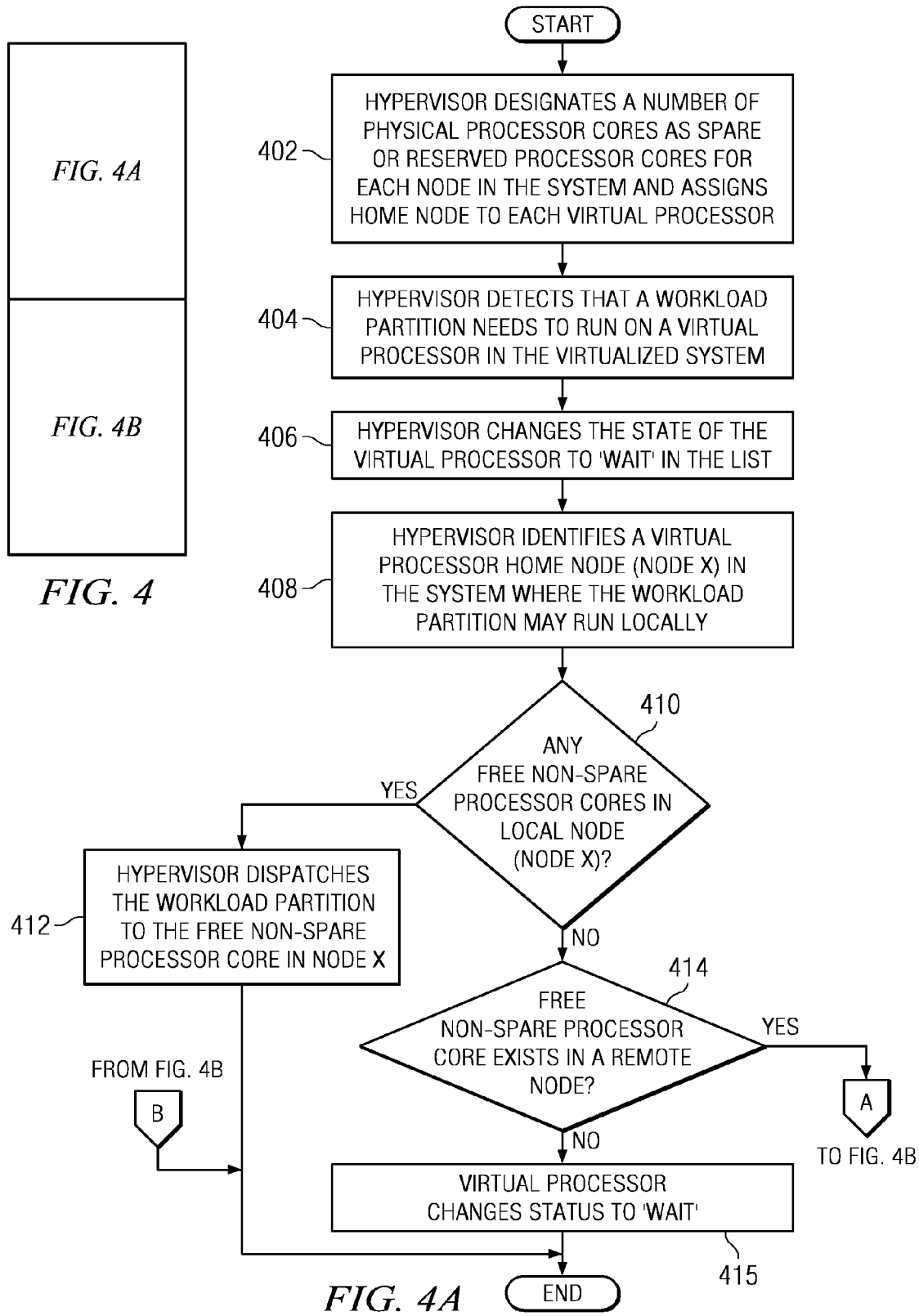

OPTIMIZING SYSTEM PERFORMANCE USING SPARE CORES IN A VIRTUALIZED ENVIRONMENT

BACKGROUND

1. Field

The disclosure relates generally to an improved data processing system, and more specifically to a computer implemented method, data processing system, and computer program product for optimizing system performance using spare processing cores in a virtualized environment.

2. Description of the Related Art

Multi-core microprocessor chips comprise a plurality of independent digital signal processor cores on one single integrated circuit chip package. The provision of multiple individual instruction processing cores enables higher computation capacity relative to single processor chip structures. Computer systems incorporating multi-core microprocessor chips usually consume less power and have a lower cost and higher reliability than alternative multi-chip systems, as well as provide assembly cost advantages by requiring fewer physical system components. With the ability to have large numbers of processors in a single chip, even low end computing systems are beginning to contain 16, 32, or 64 processors.

A Non-uniform Memory Access (NUMA) architecture is typically used by vendors to provide scalability when building servers with large numbers of processors. A NUMA architecture is a computer memory design connecting multiple clusters of processor chips in which some regions of memory are on physically different busses from other regions. Under NUMA, the length of memory access time depends on the memory location relative to a processor, such that the processor can access its own local memory faster than non-local (remote) memory (i.e., memory local to another processor or memory shared between processors). Consequently, the process of selecting processors and memory resources to consolidate workloads becomes important to achieve optimum system performance. In general performance terms, a system is being optimally used if all of the system's processor cycles are in use (i.e., maximum system utilization). However, when processor cycles are being spent on data access latency when accessing remote memory rather than being used to complete instructions, the processor cycles lost to access latency are referred to as MIPS (million instructions per second) loss. The number of MIPS is a general measure of computing performance and, by implication, the amount of work a larger computer can do. In a virtualized environment, MIPS loss can result when the system is pushed to its maximum utilization under some circumstances. In addition, virtual processors may be allocated in excess of the number of physical processors, which is known as a processor overcommit configuration. In such a configuration, the physical processors are time sliced across multiple virtual processors.

SUMMARY

The illustrative embodiments provide a computer implemented method, data processing system, and computer program product for optimizing system performance using spare processing cores in a virtualized environment. When detecting a workload partition needs to run on a virtual processor in the virtualized system, a state of the virtual processor is changed to a wait state. A first node in the virtualized system comprising memory that is local to the workload partition is determined. A determination is also made as to whether a non-spare processor core in the first node is available to run the workload partition. If no non-spare processor core is available to run the workload partition, a free non-spare processor core in a second node is located, and the state of the free non-spare processor core in the second node is changed to an inactive state. The state of a spare processor core in the first node is changed to an active state, and the workload partition is dispatched to the spare processor core in the first node for execution.

BRIEF DESCRIPTION OP THE SEVERAL VIEWS OF THE DRAWINGS

FIGS. 4A and 4B illustrate a flowchart of a process in a local node for optimizing system performance using spare processing cores in accordance with the illustrative embodiments.

DETAILED DESCRIPTION

Figure 1:
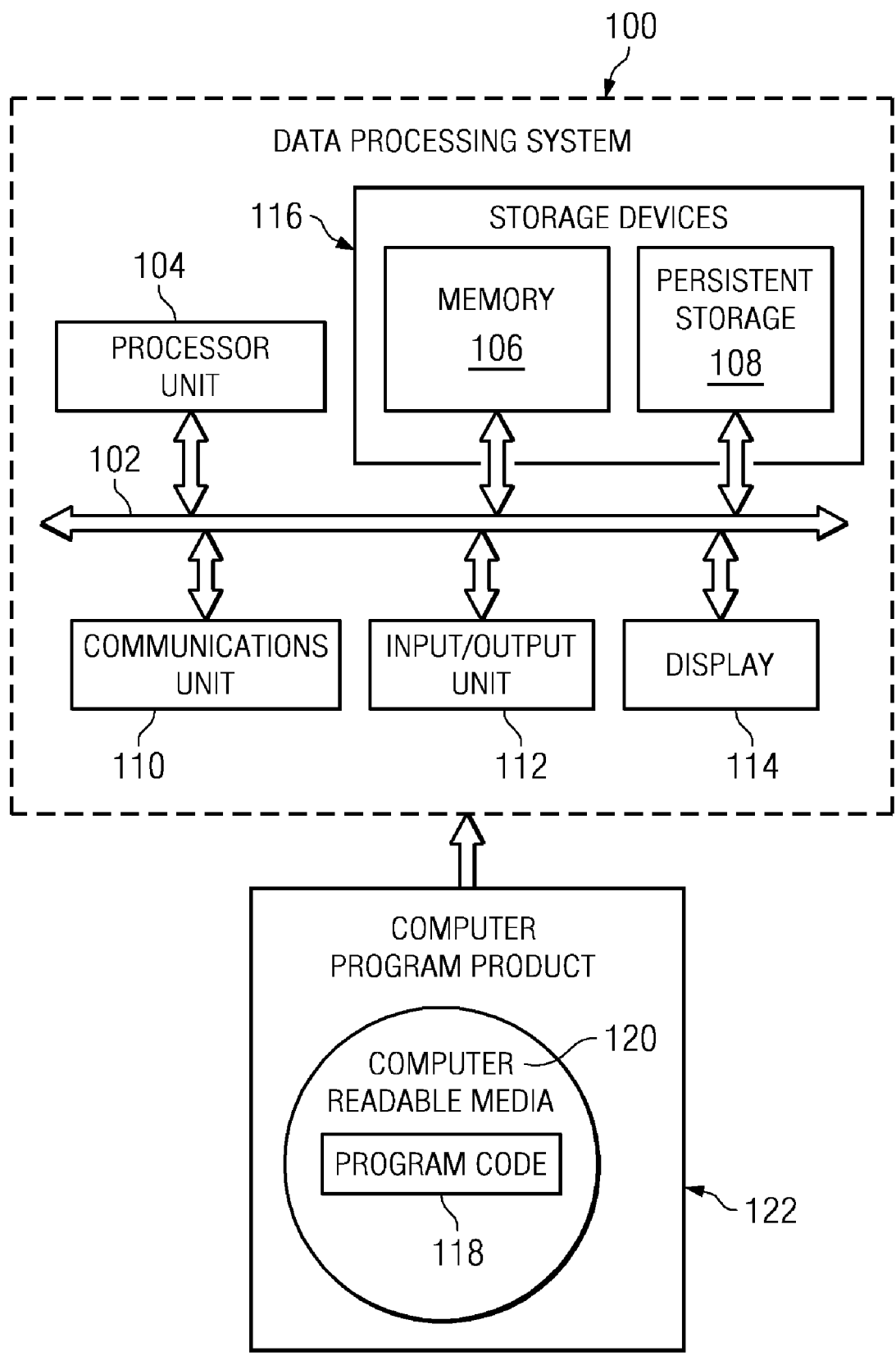
FIG. 1 is a block diagram of a data processing system in which the illustrative embodiments may be implemented.

As will be appreciated by one skilled in the art, the embodiments of the disclosure may be embodied as a system, method or computer program product. Accordingly, the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the internet or an intranet, or a magnetic storage device. Note mat the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium-mat can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

The embodiments of the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/gets specified in the flowchart and/or block diagram block or blocks.

Turning now to FIG. 1, a diagram of a data processing system is depicted in accordance with an illustrative embodiment. In this illustrative example, data processing system 108 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 188 also may be removable. For example, a removable bard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer-readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

in another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Multiprocessor data processing systems are typically partitioned and used as smaller virtual systems managed by a virtual machine. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform resources. These platform allocable resources include one or more architecturally distinct processors and their interrupt management area, regions of system memory, and input/output (I/O) adapter bus slots. Logically partitioned systems often make use of a hypervisor, which is a layer of software between the hardware and logical partitions that manages and enforces partition protection boundaries. The hypervisor is also referred to herein as a virtual partition manager. The hypervisor is responsible for configuring, servicing, and running multiple logical systems on the same physical hardware. The hypervisor is typically responsible for managing physical resources and allocating them to a partition by mapping physical resources to a partition's virtual resources. In ease of processor virtualization, partitions are configured to have virtual processors and the hypervisor dispatches physical processors to a partition by mapping physical to virtual processors.

Visualization enables the physical processors to be shared and managed among multiple partitions in a single system. These shared processors across multiple partitions are managed as a single shared pool of processors by the hypervisor. One of the goals of processor visualization is maximizing processor utilization by allocating or routing free or idle processor cycles not in use by some partitions to partitions that are busy and could use more cycles in uncapped mode. A capped partition cannot receive more cycles than its entitled capacity, while an uncapped partition can receive processor cycles beyond its entitled capacity if excess processor cycles are available in the shared processor pool. Therefore a single physical processor is not bound to any partition in a virtualized environment and the processor can be dispatched on any partition.

In a NUMA architecture, large scale multiprocessors are assembled using building blocks, or nodes. A node is defined as a region of memory having the same data access latency from each processor core in the node. As memory in a NUMA system is divided among the nodes, the data access latencies of processor cores in different nodes may vary. Memory on the same-node as a processor core currently running a local partition is referred to as local memory, while memory that does not belong to the node on which the partition is currently running is referred to as remote memory. It is faster for a processor core to access memory attached to the local node than it is for the processor core to access a remote memory location (i.e., located on another node). That is, in a virtualized environment, it is advantageous to dispatch a physical processor to a partition where the partition's memory is local to the processor.

A problem that occurs in existing systems is mat to maintain the processor cycle entitlements to each partition, a hypervisor will dispatch a partition immediately on a free processor, irrespective of whether the processor is local or remote to the partition. As a result, partitions are frequently dispatched on processors whose local memory is not part of a partition's memory. When the hypervisor dispatches a virtual processor of a partition on such a processor (remote processor or core), all of the memory accesses by the virtual processor in the partition become remote, resulting in increased data access latency, as well as additional traffic on the inter-node buses. As these inter-node system buses become increasingly busy, the additional traffic impacts not only the virtual processors of a partition that are being dispatched remotely, but also the other partitions in the system, thereby negatively impacting system performance. For example, a system comprising 8 nodes having 32 processor cores per node amounting to a 256-way laid out NUMA architecture model would be challenged to achieve 256-way scalability.

In addition, a system may be partitioned to use a consolidation model through visualization in which different applications may run in secure, isolated environments on a single server platform. The goal of consolidation is to move multiple applications from separate servers onto fewer shared servers, while visualization enables multiple applications to share a platform and resources without interfering with each other. Depending on how the system is partitioned, many of the partitions may end up with processor cores in one node (local) and with some amount of memory located in a remote node (remote memory). Remote memory access not only increases latency as a processor core must travel multiple hops, but also congests the traffic on the inter-node buses, further increasing data access latency. As a result, MIPS are wasted in these latencies when the processor cores in large servers, such as 256-, 512- or 1024-way systems, are at high utilization. Thus, as processor cycles can be lost to access latency, servers comprising a large number of processor cores may become a liability at certain utilization levels due to MIPS loss, especially when the processor cores are used in a visualized environment. In addition, as the number of processor cores is increased in a system, the system is used more as a consolidated system than a single operating system scalable system. However, in either case, the MIPS loss to some extent is inevitable when all the available processor cores are in use in the system.

The illustrative embodiments provide a solution to the problems above by providing a computer implemented method, data processing system, and computer program product for optimizing system performance using spare physical processor cores in a visualized environment. The illustrative embodiments designate a portion of the physical processor cores in a multi-core system as spare processor cores and use these spare cores to alleviate the MIPS loss and achieve greater system performance levels than levels achieved if all available processor cores are used.

A node in the illustrative embodiments may comprise one or more designated spare processor cores in addition to non-spare processor cores. A hypervisor assigns a home (local) node to each of the virtual processors that are configured in a partition in a virtualized environment. A virtualized environment is a computing environment in which underlying physical machine resources may be shared between different virtual machines, each running its own operating system. The software layer providing the virtualization is typically called a hypervisor. While processor cores and memory in a home node assigned to a virtual processor are preferable resources to be allocated to the virtual processor, due to overcommit of resources in a virtualized environment, there is no guarantee that the physical resources from the home node are always available to dispatch to the virtual processor. For example, in existing systems, when processor cores in a home node are all in use, the hypervisor will dispatch a virtual processor of a workload partition immediately to a free processor core, regardless of whether the free processor core is local (the home node) or remote (a remote node) to the partition. In contrast, with the designated spare processor core scheme in the illustrative embodiments, memory accesses of a node that has a spare processor core are allowed to remain local (i.e., the node's local memory). When regular (non-spare) processor cores in a node are all in use, the hypervisor will dispatch a virtual processor of a workload partition that is ready to run on a spare core in the node in lieu of another potential remote core. By dispatching a spare core of the node to perform the workload locally, remote memory access in the virtualized system is reduced, thereby reducing traffic on the bus and eliminating the overuse of precious internode bandwidth.

When a virtual processor of a partition becomes ready to run and the only free processors available are in remote nodes, the hypervisor selects a local spare core to dispatch the virtual processor to execute the workload instead of selecting a remote core on another node to execute the workload. When this spare core selection is made, the hypervisor marks the available remote core on the remote node as 'inactive'. The 'inactive' designation of the remote core by the hypervisor may be maintained for a time duration that ends when the hypervisor undispatches the virtual processor, due to either the lapse of a time slice of the associated physical processor (pre-empting the virtual processor from running beyond the allocated time slice) or when the hypervisor determines free processor cores are now available in the home node. While the remote core in the remote node is marked inactive, another virtual processor whose home node is the remote node becomes ready to ran. The remote core in the remote node is needed to dispatch the virtual processor to execute the workload locally to improve MIPS loss. Thus, the hypervisor repeats the process of marking a remote node as inactive and using a spare core in the virtual processor's home node to execute the workload locally. In the event there are no more spare cores in the home node, the hypervisor may change the inactive state of the remote core to an active state and use the remote core as a local core, and mark another remote core as inactive.

Thus, using the same system above that comprises 8 nodes having 32 processor cores per node, the solution provided by the illustrative embodiments provide for designating a number of the processor cores as reserved or spare cores and allowing the system to use the remaining processing cores per node. Spare processor cores may be designated by system firmware, which comprises logic for communicating with the hypervisor. (While the firmware may designate, in this example, 32 cores as spare cores, the firmware may dynamically change the total number of spare cores in the system based on the load demand of the system.) If 8 cores per node are designated as spares, the system may use only 24 cores per node, which amounts to a 192-way system. So although the system is provided as a 192 core system, the firmware knows that the system has 254 cores and the system is marked as 192 core system. Although fewer regular processor cores are being used in the system, greater system performance may still be achieved using the spare core scheme than when using all available processor cores. These spares may be used for various purposes in the 192-way system, such as for reducing power, as standby cores to replace failed cores resulting in high availability, or for maintenance purposes.

Figure 2:
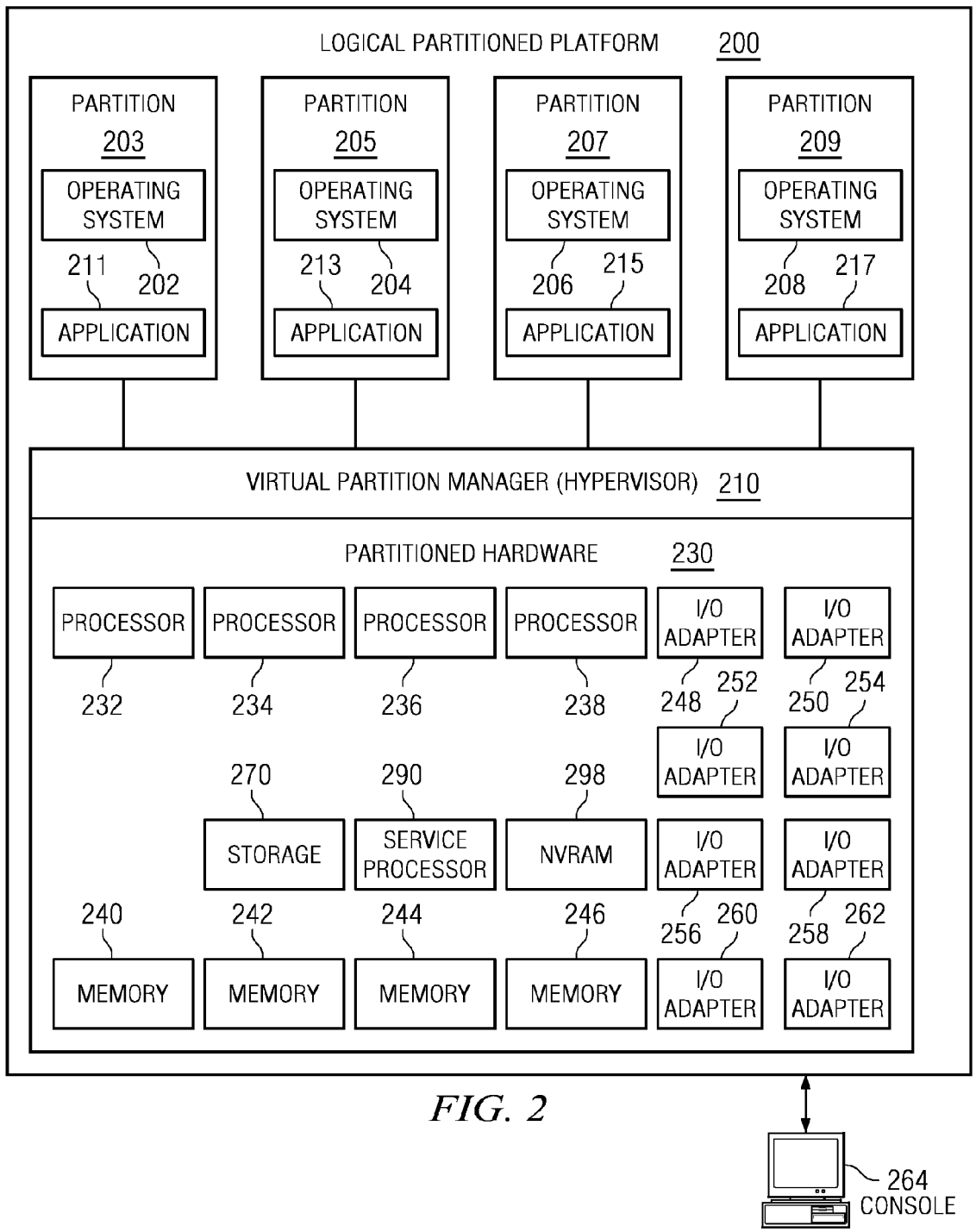
FIG. 2 is a block diagram of an exemplary logical partitioned platform and virtualized environment in which the illustrative embodiments may be implemented.

FIG. 2 is a block diagram of an exemplary logical partitioned platform and virtualized environment in which the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may foe multiple virtual copies of a single operating system or multiple heterogeneous operating systems simultaneously run on platform 200. Applications 211, 213, 215, and 217 may be multiple virtual copies of a single application or multiple heterogeneous applications simultaneously run on platform 200. Logical partitions 203, 205, 207, and 209 comprise a subset of operating systems 202, 204, 206, and 208 and applications 211, 213, 215, and 217 are located in logical partitions 203, 205, 207, and 209, respectively.

Partitioned hardware 230 includes a plurality of processors 232-238, a plurality of system memory units 240-246, a plurality of input/output (I/O) adapters 248-262, a storage unit 270, and NVRAM storage 298. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Virtual partition manager (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent operating system images 202, 204, 206, and 208 by virtualizing all the hardware resources of logical partitioned platform 200. Hypervisor 210 may partition the system and create logical partitions 203, 205, 207, and 209 to use a consolidation model through virtualization.

Operations of the different partitions may be controlled through a hardware management console, such as console 264. Console 264 is a separate data processing system from which a system administrator may perform various functions including reallocation of resources to different partitions.

Figure 3:
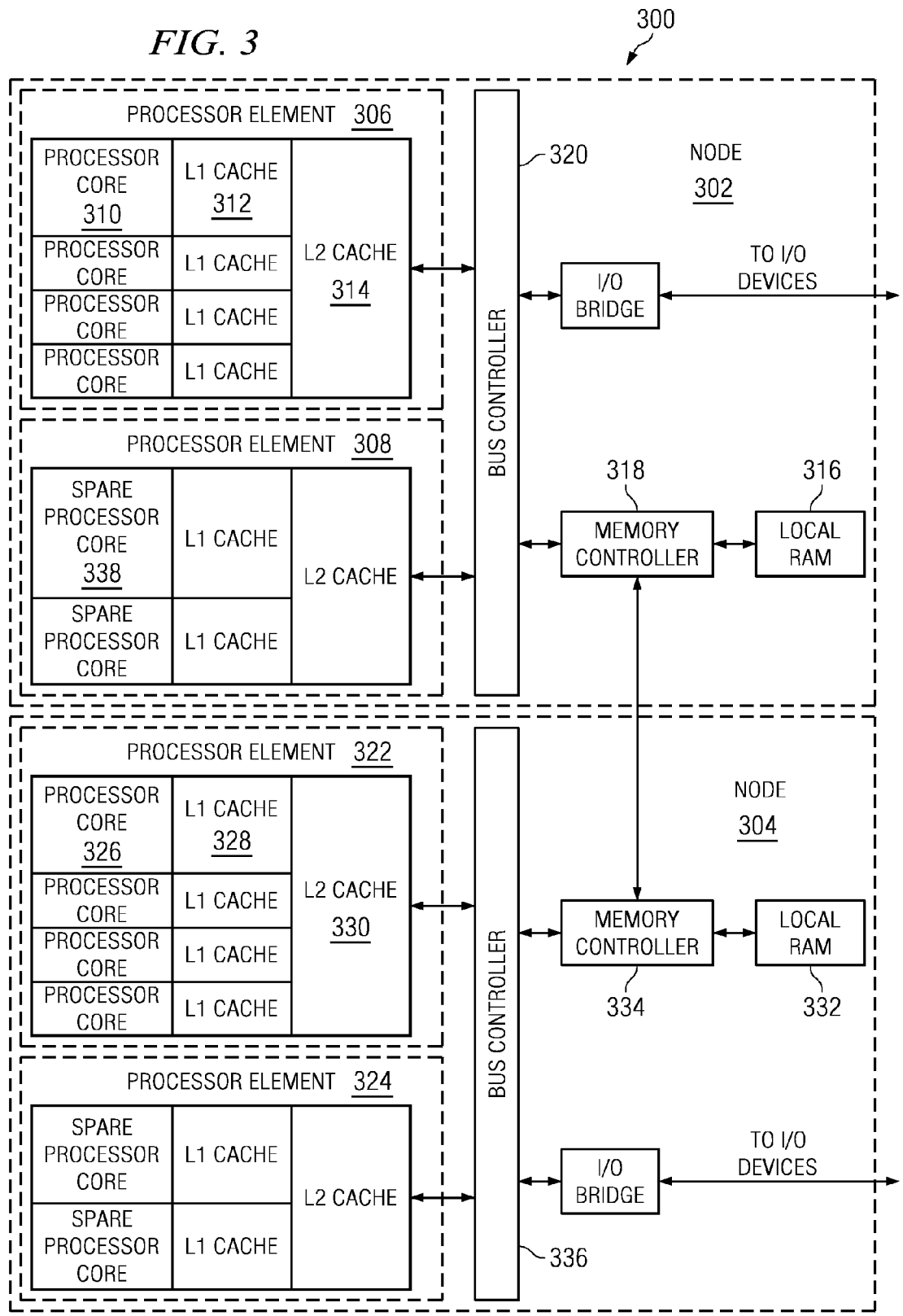
FIG. 3 is a block diagram of exemplary nodes comprising spare processing cores for optimizing system performance in a multi-processor system in accordance with the illustrative embodiments.

FIG. 3 is a block diagram of exemplary nodes comprising spare processing cores for optimizing system performance in a multiprocessor system in accordance with the illustrative embodiments. Data processing system 300 comprises a plurality of nodes, such as node 302 and 304. Each node in data processing system 300 may comprise a number of physical processors and some amount of random access memory (RAM), as well as a bus control, memory controller, and an input/output bridge. Although only two nodes are shown in this illustrative example, it should be understood that data processing system 300 may comprise other nodes comprising spare processor cores for optimizing system performance. Larger-scaled systems may be created by connecting multiple nodes together using a high speed link that permits memory to be available to executing programs.

In this illustrative example, node 302 is shown to comprise processor elements 306 and 308, and node 304 is shown to comprise processor elements 322 and 324. A node often comprises 4 to 64 processing elements, and the data processing system typically comprises 2 to 16 nodes. A "processor element" in a node is one logical attachment point to the bus and typically consists of one shared Level2 cache to which one or more processor cores are attached. Each physical processor core within a processing element typically has its own non-shared Level1 cache, such as processor core 310 and Level1 cache 312 in node 302 and processor core 326 and Level1 cache 328 in node 304. Each Level1 cache is logically placed between the processor and a Level2 cache shared among the processor elements in the node, such as Level2 cache 314 shared between processor elements 306 and 308 in node 302 and Level2 cache 330 shared between processor elements 322 and 324 in node 304. Processor elements 306 and 308 may access local RAM 316 through memory controller 318, while processor elements 322 and 324 may access local RAM 332 through memory controller 334. Bus controllers 320 and 336 may include bus arbiters for performing bus arbitration among the processing elements on the bus.

Processor element 308 in node 302 and processor element 324 in node 304 comprise spare processor cores for use in optimizing performance in data processing system 300. The spare processor cores in each node access the node's local memory at a uniform speed as the processor cores residing in the same node. In contrast with typical large scale data processing systems in which all of the processor cores in the system are used to run workload processes without regard to whether the processor cores to which the workload partitions are dispatched share local memory with the partitions, the spare processor cores in each node are used to allow the memory accesses of the node to remain local.

A hypervisor, such as hypervisor 210 in FIG. 2, may dispatch a local partition on a spare processor core in a local node in lieu of dispatching the partition on a free non-spare processor core in another node, thereby keeping the memory accesses of the node having a spare processor core local. For example, exemplary spare processor core 338 in node 302 may be used to run partitions that would normally be dispatched to remote non-spare processor core 326 in node 304. Since the hypervisor dispatches a local spare processor core to run the local partition, remote memory access is reduced, which in turn minimizes the MIPS loss in the virtualized system. The hypervisor maintains a list that tracks the spare cores in the nodes and links the state or status of each spare processor core to the state or status of the remote non-spare processor core for which a spare core is substituting. Consequently, if no local processor cores are available on node 302 to run a local partition, the hypervisor may select spare processor core 338 in node 302 to run the partition. The hypervisor changes the state or status of the spare processor core to 'active' in the list, as well as changes the state or status of the substituted remote non-spare processor core to 'inactive' in the list. This status list may be stored, in memory. Although specific core state/status designations are described in the examples, it should be noted that any other designations may be used in tracking the states of the cores (e.g., 'active', 'inactive', 'free', etc.) to enable the hypervisor to know when the hypervisor may dispatch or not dispatch a partition to a core. The hypervisor marks the remote non-spare processor core to inactive as the hypervisor cars only use the number of non-spare processor cores provided by the system. For example, using the previously mentioned 192-way system comprising 8 nodes having 32 processor cores per node and 8 cores per node designated as spare cores, the hypervisor can only use 192 processor cores. Consequently, if a spare core is being used, a non-spare core must be marked inactive to adhere to the 192-way system provided and to prevent providing additional MIPS than offered by the 192 cores.

The state or status of the spare processor core in the local node and the substituted remote non-spare processor core may be maintained until either one of two events occur—the virtual processor of a partition running on the spare processor core may finish its time slice, or another virtual processor of a partition whose home node is the remote node may be ready to run on the free remote non-spare processor core. If the partition running on the spare processor core finishes running, the hypervisor changes the state or status of the spare processor core to 'inactive' and changes the state or status of the substituted remote non-spare processor core to 'active' in the list. If another virtual processor whose home node is the remote node is ready to ran on the free remote non-spare processor core, the hypervisor pre-empts the spare processor core from running the partition on the local node and changes the state or status of the spare processor core to 'inactive' in the list. The hypervisor may dispatch the spare core to the ready to run virtual processor for a time slice. For instance, the hypervisor may dispatch the processor cores to partitions in small time slices comprising the dispatch wheel time if the entitlement of the partition is a fractional processor. That is, for a processor that is split into a 10 ms dispatch wheel time (duration), the 10 ms will be distributed across all the partitions that are sharing the single processor. For example, if two partitions are both configured for 0.5 processors, the hypervisor allocates a physical processor for 5 ms for one partition, and will reallocate the physical processor to the second partition for the other 5 ms in that dispatch wheel time. The hypervisor repeats the allocation distribution in the next dispatch wheel time. A partition may sometimes not use all of its allotted 5 ms, such as when the partition is waiting for an input/output (I/O) operation to complete. In this case, the partition returns the processor to the hypervisor, which allocates the processor for use by other partitions. The hypervisor may not pre-empt a virtual processor that is running on a spare processor core if a non-spare core becomes available in the local node. The hypervisor will let the virtual processor run the dispatched time slice. The hypervisor also changes the state or status of the substituted remote non-spare processor core to 'active' in the list.

Figure 4B:
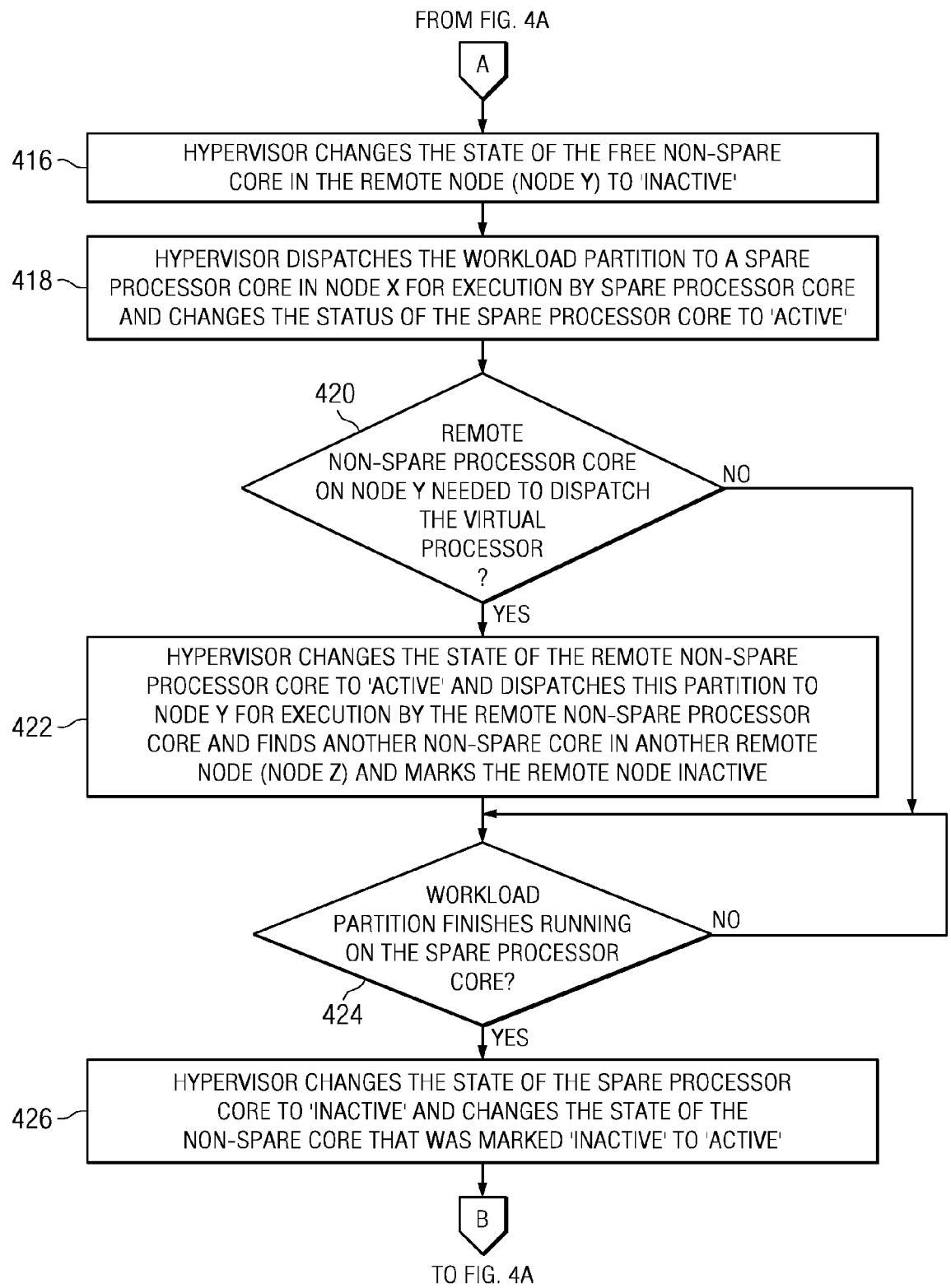

FIGS. 4A and 4B illustrates a flowchart of a process in a local (home) node for optimizing system performance using spare processing cores in accordance with the illustrative embodiments. The process described in FIGS. 4A and 4B may be implemented within a visualized environment, such as by the hypervisor in logical partitioned platform 200 in FIG. 2.

The process begins with the system firmware designating, for each node in the system, a number of physical processor cores as spare or reserved processor cores (step 402). The hypervisor also assigns a home node to every virtual processor in the system. When the hypervisor or virtual partition manager detects that a workload partition needs to run on a virtual processor in the visualized system (step 404), the hypervisor changes the state of the virtual processor to a 'wait' state in the status list maintained by the hypervisor (step 406). The hypervisor then identifies the virtual processor home node (node X) in the system in which the workload partition may run locally (i.e., node X comprises memory that is local to the workload partition) (step 408). The hypervisor makes a determination as to whether any of the non-spare processor cores in node X are free by checking the status of the cores tracked in the status list (step 410). If the hypervisor locates a free non-spare core in node X ('yes' output of step 410), the hypervisor dispatches the workload partition to the free non-spare processor core in node X (step 412), with the process terminating thereafter.

However, if the hypervisor does not locate a free non-spare processor core in node X ('no' output of step 410), the hypervisor then checks the status of the remote nodes in the system to determine if a free non-spare processor core exists in a remote node (step 414). If a free non-spare processor core does not exist ('no' output of step 414), the status of the virtual processor is changed to a 'wait' state (step 415), with the process terminating thereafter. If a free non-spare processor core exists in remote node Y ('yes' output of step 414), the hypervisor changes the state of the free non-spare core in remote node Y to 'inactive' in the status list (step 416). The hypervisor then dispatches the workload partition to a spare processor core so node X for execution locally on node X and changes the state of the spare processor core to 'active' in the status list (step 418).

While the spare processor core of node X remains in an 'active' state, another virtual processor whose home node is the remote node (node Y) becomes ready to ran, then the hypervisor makes a determination as to whether the node Y non-spare processor core is needed to dispatch the virtual processor (step 420). If the node Y non-spare processor core (currently marked inactive) is not needed to run the partition locally on node Y ('no' output of step 420), the process continues to step 424. However, if the node Y non-spare processor core is needed to run the partition locally on node Y ('yes' output of step 420), the hypervisor changes the state of the remote non-spare processor core to 'active' in the list and dispatches this partition to node Y and finds another non-spare core in another remote node (node Z) and marks it inactive (step 422). The process then continues to step 424.

At step 424, the hypervisor makes a determination as to whether the workload partition finishes running on the spare processor core. If the workload partition is not finished running on the spare processor core ('no' output of step 424), the process loops back to step 424 and continues to check the processing status of the workload partition. However, if the workload partition is finished running on the spare processor core ('yes' output of step 424), the hypervisor changes the state of the spare processor core to 'inactive' in the list and changes the state (to active) of the non-spare core that was marked inactive (step 426) with the process terminating thereafter.

Figure 5:
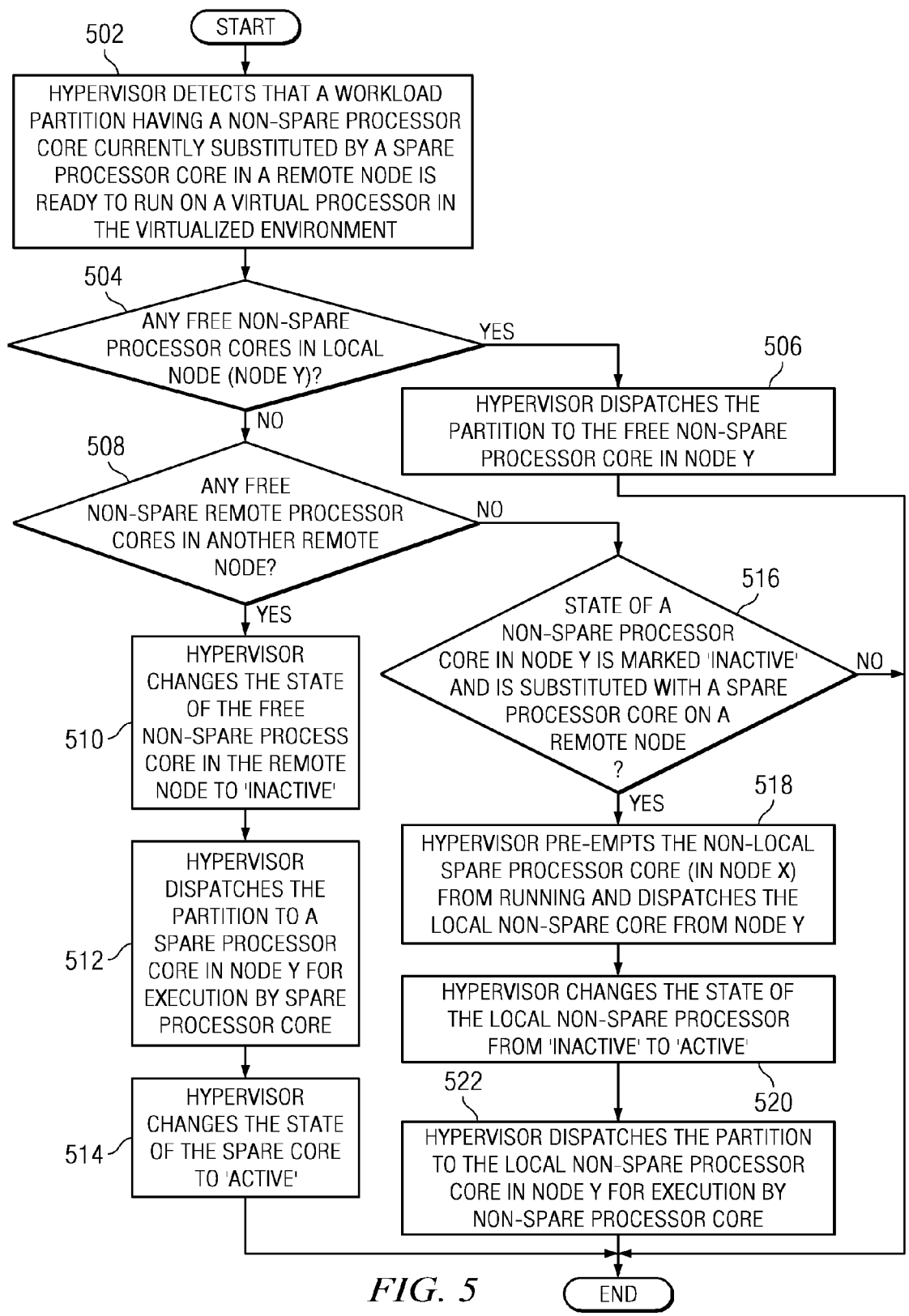
FIG. 5 illustrates a flowchart of a process in a remote node for optimizing system performance using spare processing cores in accordance with the illustrative embodiments.

FIG. 5 illustrates a flowchart of a process in a remote node for optimizing system performance using spare processor cores in accordance with the illustrative embodiments. The process described in FIG. 5 may occur at a time after the process described in FIGS. 4A and 4B has occurred and at the remote node Y. The process described in FIG. 5 may be implemented within a virtualized environment, such as by the hypervisor in logical partitioned platform 200 in FIG. 2.

The process begins when the hypervisor detects that a workload partition having a non-spare processor core currently substituted by a spare processor core in node X is ready to run on a virtual processor in the virtualized environment (step 582). The hypervisor then makes a determination whether any non-spare processor cores in node Y (local to the partition ready to run) are free (step 504). If a non-spare processor core in node Y is free ('yes' output of step 504), the hypervisor dispatches the partition to the free non-spare processor core in node Y (step 506), with the process terminating thereafter.

However, if no non-spare processor cores in node Y are free ('no' output of step 504), the hypervisor makes a determination as to whether any non-spare remote processor cores in another remote node (e.g., remote node X or remote node Z) are free (step 508). If the hypervisor locates a free non-spare core in a remote node ('yes' output of step 588), the hypervisor changes the state of the free non-spare process core in the remote node to 'inactive' in the status list maintained by the hypervisor (step 510). The hypervisor then dispatches the partition to a spare processor core in node Y (step 512) for execution by the spare processor core locally on node Y and changes the state of the spare processor core to 'active' in the list (step 514), with the process terminating thereafter.

Turning back to step 588, if the hypervisor does not locate a free non-spare core in a remote node ('no' output of step 508), the hypervisor makes a determination as to whether the state of a non-spare processor core in node Y is marked 'inactive' and is substituted with a spare processor core in a remote node (e.g., remote node X or remote node Z) (step 516). If no local non-spare processor core is marked 'inactive' and is substituted with a spare processor core in a remote node ('no' output of step 516), the process terminates thereafter.

However, if there is a local non-spare processor core (in this case node Y) marked 'inactive' and substituted with a spare processor core in a remote node (in this case node X) ('yes' output of step 516), the hypervisor pre-empts the spare processor core in the remote node (in this case node X) from running and dispatches the local non-spare processor core torn node Y (step 518). The hypervisor then changes the state of the local non-spare processor core from 'inactive' to 'active' in the list (step 520) and dispatches the local partition to ran on the now active non-spare processor core in node Y (step 522). The non-spare processor core may then execute the partition locally on node Y.

The flowchart and block diagrams in the Figures illustrate the architecture, functionality, and operation of possible implementations of systems, methods and computer program products according to various embodiments of the embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the invention in the form disclosed. Many modifications and variations will fee apparent to those of ordinary skill in the art without departing from the scope and spirit of the invention. The embodiment was chosen and described in order to best explain the principles of the invention and the practical application, and to enable others of ordinary skill, in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using spare processing cores in a virtualized environment, the computer implemented method comprising:

responsive to detecting that a first workload partition needs to run on a virtual processor in the virtualized system, changing a state of the virtual processor to a wait state, wherein the virtualized system comprises a plurality of nodes;

determining a first node from the plurality of nodes in the virtualized system comprising memory that is local to the workload partition;

determining whether a non-spare processor core in the first node is available to run the workload partition, wherein states of non-spare processor cores and spare processor cores in the virtualized system are maintained in a processor core status list managed by a virtual partition manager;

responsive to a determination that no non-spare processor core is available to run the first workload partition, locating a free non-spare processor core in a second node from the plurality of nodes;

changing a state of the free non-spare processor core in the second node to an inactive state;

changing a state of a spare processor core in the first node to an active state; and dispatching the first workload partition to the spare processor core in the first node for execution.

2. The computer implemented method of claim 1, further comprising:
   determining, while the state of the spare processor core in the first node is in the active state, whether the free non-spare processor core in the second node is needed to run a second workload partition locally on the second node;
   responsive to a determination that the free non-spare processor core in the second node is not needed to run the second workload partition on the second node, determining whether the first workload partition has finished running on the spare processor core in the first node; and
   responsive to a determination that the first workload partition has finished running on the spare processor core, changing the state of the spare processor core in the first node to an inactive state.

3. The computer implemented method of claim 2, further comprising;
   responsive to a determination that the free non-spare processor core in the second node is needed to run the second workload partition on the second node, determining whether the first workload partition has finished running on the spare processor core in the first node;
   responsive to a determination that the first workload partition has finished running on the spare processor core, changing the state of the spare processor core in the first node to an inactive state;
   changing the state of the non-spare processor core in the second node to an active state; and
   dispatching the second workload partition to the free non-spare processor core in the second node.

4. The computer implemented method of claim 1, further comprising:
   detecting that a third workload partition is ready to run on a virtual processor in the virtualized system, wherein the third workload partition is local to the non-spare processor core in the second node that is currently substituted by the spare processor core in the first node;
   determining whether a non-spare processor core in the second node is available to run the third workload partition locally;
   responsive to a determination that no non-spare processor core in the second node is available to run the workload partition, determining whether a free non-spare processor core exists in a remote node in the virtualized system;
   responsive to a determination that a free non-spare processor core does not exist in the remote node, locating a non-spare processor core in the second node having an inactive state and currently substituted with a spare processor core in a remote node;
   pre-empting the spare processor core in the remote node from running the third workload partition on the second node;
   changing a state of the non-spare processor core in the remote node to an active state; and
   dispatching the third workload partition to the non-spare processor core in the remote node for execution.

5. The computer implemented method of claim 4, further comprising:
   responsive to a determination that a non-spare processor core in the second node is available to run the third workload partition, dispatching the third workload partition to the non-spare processor core to run the third workload partition on the second node.

6. The computer implemented method of claim 4, further comprising:
   responsive to a determination that a free non-spare processor core exists in a remote node, changing a state of the free non-spare processor code in the remote node to an inactive state;
   changing a state of a spare processor core in the second node to an active state; and
   dispatching the third workload partition to the spare processor core in the second node for execution.

7. The computer implemented method of claim 1, wherein determining whether a non-spare processor core in the first node is available to run the first workload partition comprises checking the processor core status list to locate a non-spare processor core having an active state.

8. The computer implemented method of claim 1, further comprising:
   responsive to a determination that a non-spare processor core in the first node is available to run the first workload partition, dispatching the first workload partition to the non-spare processor core to run the workload partition.

9. The computer implemented method of claim 1, wherein the changing, locating determining, and dispatching steps are performed by the virtual partition manager.

10. The computer implemented method of claim 1, wherein a number of physical processor cores in the virtualized environment are designated as spare processor cores prior to detecting that a workload partition needs to run on a virtual processor in the virtualized system.

11. An apparatus comprising;
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to change, in response to detecting that a workload partition needs to run on a virtual processor in the virtualized system wherein the virtualized system comprises a plurality of nodes, a state of the virtual processor to a wait state; determine a first node from the plurality of nodes in the virtualized system comprising memory that is local to the workload, partition; determine whether a non-spare processor core in the first node is available to run the workload partition, wherein states of non-spare processor cores and spare processor cores in the virtualized system are maintained in a processor core status list managed by a virtual partition manager; locate, in response to a determination that no non-spare processor core is available to run the workload partition, a free non-spare processor core in a second node from the plurality of nodes; change a state of the free non-spare processor core in the second node to an inactive state; change a state of a spare processor core in the first node to an active state; and dispatch the workload partition to the spare processor core in the first node for execution.

12. A computer program product in a computer storage device having computer usable program code stored thereon, the computer usable program code for execution by a computer, comprising:
    computer usable program code for changing, in response to detecting that a first workload partition needs to run on a virtual processor in the virtualized system, a state of the virtual processor to a wait state, wherein the virtualized system comprises a plurality of nodes;

computer usable program code for determining a first node from the plurality of nodes in the virtualized system comprising memory that is local to the first workload partition;

computer usable program code for determining whether a non-spare processor core in the first node is available to run the first workload partition, wherein states of non-spare processor cores and spare processor cores in the virtualized system are maintained in a processor core status list managed by a virtual partition manager;

computer usable program ode for locating, in response to a determination that no non-spare processor core is available to run the first workload partition, a free non-spare processor core in a second node from the plurality of nodes;

computer usable program code for changing a state of the free non-spare processor core in the second node to an inactive state;

computer usable program code for changing a state of a spare processor core in the first node to an active state; and computer usable program code for dispatching the first workload partition to the spare processor core in the first node for execution.

13. The computer program product of claim 12, further comprising:

computer usable program code for determining, while the state of the spare processor core in the first node is in the active state, whether the free non-spare processor core in the second node is needed to run a second workload partition locally on the second node;

computer usable program ode for determining, in response to a determination that the free non-spare processor core in the second node is not needed to run the second workload partition on the second node, whether the first workload partition has finished running on the spare processor core in the first node; and computer usable program code for changing, in response to a determination that the first workload partition has finished running on the spare processor core, the state of the spare processor core in the first node to an inactive state.

14. The computer program product of claim 13, further comprising:

computer sable program code for determining, in response to a determination that the free non-spare processor core in the second node is needed to run the second workload partition on the second node, whether the first workload partition has finished running on the spare processor core in the first node;

computer usable program code for changing, in response to a determination that the first workload partition has finished running on the spare processor core, the state of the spare processor core in the first node to as inactive state;

computer usable program code for changing the state of the non-spare processor core in the second node to an active state; and computer usable program code for dispatching the second workload partition to the free non-spare processor core in the second node.

15. The computer program product of claim 12, further comprising;

computer sable program code for detecting that a third workload partition is ready to run on a virtual processor in the virtualized system, wherein the third workload partition is local to the non-spare processor core in the second node that is currently substituted by the spare processor core in the first node;

computer usable program code for determining whether a non-spare processor core in the second node is available to run the third workload partition locally; computer usable program code for determining, in response to a determination that no non-spare processor core in the second node is available to run the first workload partition, whether a free non-spare processor core exists in a remote node in the virtualized system;

computer usable program code for locating, in response to a determination that a free non-spare processor core does not exist in a remote node, a non-spare processor core in the second node having an inactive state and currently substituted with a spare processor core in the remote node;

computer usable program code for pre-empting the spare processor core in the remote node from running the third workload partition on the second node;

computer usable program code for changing a state of the non-spare processor core in the remote node to an active state; and computer usable program code for dispatching the third workload partition to the non-spare processor core in the remote node for execution.

16. The computer program product of claim 15, further comprising:

computer sable program code for dispatching, in response to a determination that a non-spare processor core in the second node is available to run the third workload partition, the third workload partition to the non-spare processor core to run the third workload partition on the second node.

17. The computer program product of claim 15, further comprising:

computer usable program code for changing, in response to a determination that a free non-spare processor core exists in a remote node, a state of the free non-spare processor code in the remote node to an inactive state;

computer usable program code for changing a state of a spare processor core in the second node to an active state; and computer usable program code for dispatching the third workload partition to the spare processor core in the second node for execution.

18. The computer program product of claim 12, wherein the computer usable program code for determining whether a non-spare processor core in the first node is available to run the first workload partition comprises checking the processor core status list to locate a non-spare processor core having an active state.

19. The computer program product of claim 12, further comprising:

computer sable program code for dispatching, in response to a determination that a non-spare processor core in the first node is available to run the first workload partition, the workload partition to the non-spare processor core to run the first workload partition.

* * * * *